(12) United States Patent
Arai et al.

(10) Patent No.: US 7,060,761 B2
(45) Date of Patent: Jun. 13, 2006

(54) EPOXY RESIN COMPOSITIONS

(75) Inventors: Kazuhiro Arai, Gunma-ken (JP); Satoshi Asai, Gunma-ken (JP); Hideto Kato, Gunma-ken (JP)

(73) Assignee: Shin-Etsu Chemical Co.,Ltd., Tokyo (JP)

( * ) Notice: Subject to any disclaimer, the term of this patent is extended or adjusted under 35 U.S.C. 154(b) by 357 days.

(21) Appl. No.: 10/639,623

(22) Filed: Aug. 13, 2003

(65) Prior Publication Data

US 2004/0034187 A1  Feb. 19, 2004

(30) Foreign Application Priority Data

Aug. 13, 2002 (JP) .............................. 2002-235623

(51) Int. Cl.
*C08L 83/06* (2006.01)

(52) U.S. Cl. ..................................... 525/476; 525/423

(58) Field of Classification Search ..................... None
See application file for complete search history.

(56) References Cited

U.S. PATENT DOCUMENTS

| | | | | |
|---|---|---|---|---|
| 5,143,951 A | * | 9/1992 | Ohta et al. | 523/435 |
| 5,157,061 A | * | 10/1992 | Ito et al. | 523/433 |
| 5,512,376 A | | 4/1996 | Brady et al. | 428/447 |
| 5,583,195 A | | 12/1996 | Eckberg | 528/26 |
| 5,998,509 A | * | 12/1999 | Hayase et al. | 523/425 |
| 6,590,010 B1 | * | 7/2003 | Kato et al. | 522/148 |
| 6,899,991 B1 | * | 5/2005 | Kato et al. | 430/270.1 |

FOREIGN PATENT DOCUMENTS

EP    1 186 624 A1    3/2002

OTHER PUBLICATIONS

CAPLUS accession No. 1984:176184 for Japanese Patent No. 59-18724, Nitto Electric Industrial Co., Ltd., Jan. 31, 1984.*
CAPLUS accession No. 1987:177698 for Japanese Patent No. 61-243853, Shin-Etsu Chemical Industry Co., Ltd. Oct. 30, 1986.*
CAPLUS accession No. 1989:116032 for Japanese Patent No. 63-135416, Toshiba Corporation, Jun. 7, 1988.*
CAPLUS accession No. 1990:516798 for Japanese Patent No. 2-120315, Sumitomo Bakelite Co., Ltd., May 8, 1990.*
CAPLUS accession No. 1990:573833 for Japanese Patent No. 2-173025, Sumitomo Bakelite Co., Ltd., Jul. 4, 1990.*
CAPLUS accession No. 1992:22260 for Japanese Patent No. 3-170522, Sumitomo Bakelite Co., Ltd., Jul. 24, 1991.*
CAPLUS accession No. 1994:325476 for Japanese Patent No. 6-25510, Denki Kagaku Kogyo Kk, Feb. 1, 1994.*
CAPLUS accession No. 1995:546645 for Japanese Patent No. 6-283632, Nitto Denko Corporation, Oct. 7, 1994.*
CAPLUS accession No. 1995:721543 for Japanese Patent No. 7-118505, Matsushita Electric Works, Ltd., May 9, 1995.*
CAPLUS accession No. 1998:38721 for Japanese Patent No. 10-7771, Matsushita Electric Works, Ltd., Jan. 13, 1998.*
Kossmehl et al., Makromol. Chem., Vo. 191 (1990) pp. 3107-3113.

* cited by examiner

*Primary Examiner*—Robert Sellers
(74) *Attorney, Agent, or Firm*—Birch,Stewart,Kolasch & Birch,LLP

(57) ABSTRACT

An epoxy resin composition comprising (i) a compound having at least two epoxy groups in a molecule as a main component, (ii) a fluorene skeleton-bearing, silicone-modified phenolic resin as a curing agent, and (iii) an organophosphorus compound, amine compound or imidazole compound as a cure accelerator cures into an elastomeric product having a low elasticity, toughness and low dielectric properties.

9 Claims, No Drawings

EPOXY RESIN COMPOSITIONS

TECHNICAL FIELD

This invention relates to epoxy resin compositions using a fluorene skeleton-bearing, silicone-modified phenolic resin as a curing agent.

BACKGROUND ART

In general, epoxy resins in the cured state have the following characteristics.
(1) Molded parts have less internal strain due to minimized shrinkage during molding and thus have high mechanical strength.
(2) The cured epoxy resins are fully electrically insulating.
(3) With respect to chemical resistance, the cured epoxy resins have good resistance to acids and alkalis though depending on the type of curing agent used.
(4) On use as adhesive or paint, the cured or modified epoxy resins have good bond strength and adhesion due to the presence of hydroxyl groups or ether bonds, and require no pressure for bonding.
(5) Appropriate modification allows epoxy resins to find a wider variety of applications.

By virtue of the superior physical, mechanical and electrical properties of cured products, prior art epoxy resin compositions are widely used as semiconductor encapsulating materials for protecting semiconductor devices such as diodes, ICs and LSIs from moisture and contaminants in the ambient atmosphere, for providing electrical insulation and for preventing mechanical failure; insulating materials for heavy-duty electric machines such as indoor insulators, instrument transformers, switch parts, power distribution transformers, outdoor insulated equipment, and rotating machines; laminates using epoxy varnish-based prepreg such as copper-clad laminates, epoxy resin FRP, filament windings, and voidless FRP; epoxy resin base adhesives and epoxy resin base paints.

On the other hand, the epoxy resin compositions in the cured state simultaneously have the drawback that they are very hard and brittle. Particularly when an interface exists between an epoxy resin composition and a different material, the difference in coefficient of expansion can cause internal stresses to generate in the cured epoxy resin composition whereby the cured resin becomes cracked. For instance, in the case of an epoxy resin encapsulant from which a plastic semiconductor package is molded, a thermal cycling test tends to invite cracks and delamination due to internal stresses at the interface between the resin and the metallic lead frame. In the case of epoxy resin base paint, the temperature difference from the environment can cause internal stresses to generate at the interface whereby the paint coating is cracked. To minimize the internal stresses that can cause such deficiencies, the epoxy resin composition in the cured state must be reduced in modulus of elasticity.

In the current situation where the operation of semiconductor devices becomes faster every year, prior art semiconductor epoxy resin encapsulants in which bisphenol or novolac type epoxy resins are cured with acid anhydrides or phenol novolac resins give rise to the problem that the package can heat up because the high dielectric constant prevents the encapsulant from following the frequency of operation of the semiconductor device. There is a need for low dielectric semiconductor epoxy resin encapsulants.

SUMMARY OF THE INVENTION

An object of the invention is to provide an epoxy resin composition affording a low elastic, low dielectric cured product.

It has been found that using a fluorene skeleton-bearing, silicone-modified phenolic resin as a curing agent, an epoxy resin composition can be formulated which cures into a product having a low elasticity, toughness and low dielectric properties.

Accordingly, the invention provides an epoxy resin composition comprising
(i) a compound having at least two epoxy groups in a molecule as a main component,
(ii) a fluorene skeleton-bearing, silicone-modified phenolic resin comprising recurring units of the following general formula (1) and having a weight average molecular weight of 1,000 to 500,000, as a curing agent,

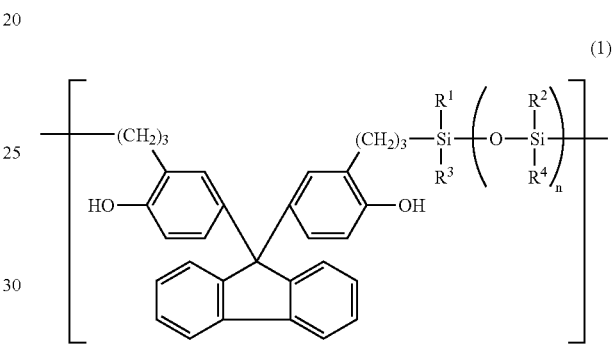

wherein $R^1$ to $R^4$ are each independently a monovalent hydrocarbon group having 1 to 10 carbon atoms, n representative of the number of repeating units is an integer of 1 to 2,000, and
(iii) at least one of an organophosphorus compound, an amine compound and an imidazole compound as a cure accelerator.

DESCRIPTION OF THE PREFERRED EMBODIMENT

The main component or base polymer (i) of the epoxy resin composition of the invention is any compound having at least two epoxy groups, preferably two to six epoxy groups in a molecule, which may be in any solid, semi-solid or liquid form. Prior art well-known compounds having epoxy groups are useful. Examples include bisphenol A epoxy resins, bisphenol F epoxy resins, phenol novolac type epoxy resins, o-cresol novolac type epoxy resins, alicyclic diepoxyacetal, alicyclic diepoxyadipate, alicyclic diepoxycarboxylate, vinylcyclohexene dioxide, phthalic acid diglycidyl ester, tetrahydrophthalic acid diglycidyl ester, hexahydrophthalic acid diglycidyl ester, p-hydroxybenzoic acid diglycidyl ester, norbornane-2,3-dicarboxylic acid diglycidyl ester, 5-norbornene-2,3-dicarboxylic acid diglycidyl ester, hexahydrotrimellitic acid triglycidyl ester, N,N-diglycidylaniline, tetraglycidyl diaminodiphenylmethane, triglycidyl p-aminophenol, triglycidyl m-aminophenol, diglycidyl toluidine, tetraglycidyl m-xylenediamine, tetraglycidyl bisaminomethylcyclohexane, diglycidyl hydantoin, glycidyl glycidoxyalkylhydantoin, triglycidyl isocyanurate, 2,2',4,4'-tetramethylbiphenyl-3,3'-diglycidyl ether, triphenylmethane triglycidyl ether, di(methylphenyl)-t-butylphenyl triglycidyl ether, and phenol naphthalene novolac. These epoxy resins may be used alone or in admixture.

In the epoxy resin composition of the invention, the curing agent (ii) is a fluorene skeleton-bearing, silicone-modified phenolic resin comprising recurring units of the following general formula (1) and having a weight average molecular weight of 1,000 to 500,000.

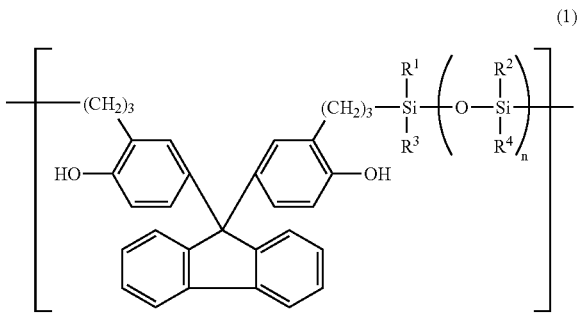

In formula (1), $R^1$ to $R^4$, which may be the same or different, are monovalent hydrocarbon groups having 1 to 10 carbon atoms, preferably 1 to 6 carbon atoms, for example, straight, branched or cyclic alkyl groups such as methyl, ethyl, propyl, isopropyl, n-butyl, tert-butyl and cyclohexyl, straight, branched or cyclic alkenyl groups such as vinyl, allyl, propenyl, butenyl, hexenyl and cyclohexenyl, aryl groups such as phenyl and tolyl, and aralkyl groups such as benzyl and phenylethyl. These groups may be included in any desired proportion.

The subscript n is representative of the number of repeating units and is an integer of 1 to 2,000, preferably 1 to 20.

The silicone-modified phenolic resin has a weight average molecular weight (Mw) of 1,000 to 500,000, preferably 1,000 to 5,000. With Mw of less than 1,000, the epoxy resin composition in the cured state is not sufficiently tough. With Mw of more than 500,000, the composition has too high a viscosity to work.

The fluorene skeleton-bearing, silicone-modified phenolic resin contributes to the low elasticity, toughness and low dielectric properties that the cured product of the inventive composition exhibits. More particularly, the inclusion of a siloxane chain within the molecule is effective for reducing the elasticity of the cured epoxy resin composition to form a flexible elastomer. The fluorene skeleton within the molecule is very robust and low dielectric as compared with ordinary phenolic resin skeletons, and thus effective for improving the heat resistance, mechanical strength and electric properties of the cured epoxy resin composition.

In the practice of the invention, one or more other curing agents may be used in combination with the curing agent (ii). Any of conventional curing agents for epoxy resins known to the art may be used in combination with the fluorene skeleton-bearing, silicone-modified phenolic resin. Suitable curing agents include amines such as diethylene triamine (DETA), triethylene tetramine (TETA), diethylaminopropylamine (DEAPA), m-phenylenediamine (MPDA), 4,4'-methylenedianiline (MDA), diaminodiphenylsulfone (DADPS), and N-methylpiperazine; acid anhydrides such as maleic anhydride (MA), phthalic anhydride (PA), hexahydrophthalic anhydride (HHPA), tetrahydrophthalic anhydride (THPA), pyromellitic acid dianhydride (PMDA), and trimellitic anhydride (TMA); phenolic resins such as phenol novolac, phenol aralkyl novolac, and phenol naphthalene novolac resins; polyamide resins, polysulfide resins and dicyandiamide.

When the other curing agent is used in combination with the fluorene skeleton-bearing, silicone-modified phenolic resin, the proportion of the other curing agent is preferably up to 50% by weight, more preferably up to 25% by weight of the entire curing agent. If the other curing agent is used in a proportion of more than 50% by weight, the cured epoxy resin composition may fail to have a low elasticity, toughness and low dielectric properties.

In the invention, the curing agent is blended in an effective amount to cure. The compound having at least two epoxy groups in a molecule as component (i) and the fluorene skeleton-bearing, silicone-modified phenolic resin represented by formula (1) and having a Mw of 1,000–500,000 as component (ii) are preferably mixed such that the ratio of the number of epoxy groups in component (i) to the number of phenolic hydroxyl groups in component (ii) is from 0.1:1 to 10:1, especially from 0.5:1 to 2:1, as long as the heat resistance, mechanical strength and electric properties of the cured epoxy resin composition are concerned.

In the epoxy resin composit[ion of the invention, the cure accelerator (iii) is selected from among organophosphorus compounds, amine compounds and imidazole compounds which are known in the art. Suitable organophosphorus compounds include, but are not limited to, triphenylphosphine, tributylphosphine, tridecylphosphine, triphenylphosphine triphenylborane, tetraphenylphosphonium tetraphenylborate, and dimethyltetraphenyl diphosphine. Suitable amine compounds include, but are not limited to, benzyldimethylamine (BDMA), dimethylaminomethylphenol (DMP-10), tris(dimethylaminomethyl)phenol (DMP-30), and 1,8-diazabicyclo(5,4,0)undecene-7 (DBU). Suitable imidazole compounds include, but are not limited to, 2-methyl-4-ethylimidazole (2E4MZ), 2-phenylimidazole (2PZ), 2-methylimidazole (2MZ), and 1-benzyl-2-phenylimidazole (1B2PZ). These cure accelerators may be used alone or in admixture.

The cure accelerator is preferably blended in an amount of 0.1 to 10% by weight, more preferably 0.5 to 2% by weight based on the total weight of base polymer (i) and curing agent (ii).

If necessary, solvents such as toluene and methyl isobutyl ketone (MIBK), fillers such as silica powder and alumina powder, and additives including colorants, flame retardants, mold release agents and coupling agents may be compounded in the epoxy resin composition of the invention.

Preparation and curing of the epoxy resin composition of the invention may be performed by conventional techniques. Preferably the composition is cured at a temperature of 100 to 200° C. for about 1 to 24 hours.

EXAMPLE

Examples of the invention are given below by way of illustration and not by way of limitation.

Reference is first made to the synthesis of fluorene skeleton-bearing, silicone-modified phenolic resins used in Examples.

Synthesis Example 1

A flask equipped with a stirrer, thermometer, nitrogen purge line and reflux condenser was charged with 43.0 g of 4,4'-(9H-fluoren-9-ylidene)bis[(2-propenyl)phenol], 60 g of toluene, and 0.1 g of chloroplatinic acid and heated at 80° C.

Thereafter, 13.4 g of 1,3-dihydro-1,1,3,3-tetramethyl-disiloxane was added dropwise to the flask. The dropwise addition was followed by ripening at 100° C. for one hour. The toluene was then distilled off. There was obtained 54 g of a solid product.

On IR analysis of the product, the absorption peaks attributable to hydrosilyl and allyl groups were not observed, indicating that the reaction was completed. Instead, an absorption peak attributable to siloxane bond appeared at 1050 cm$^{-1}$. On GPC analysis, the product had a weight average molecular weight of 18,000 as determined on a basis of polystyrene standards.

These structural analyses indicated that the product was an organosiloxane polymer having the recurring units shown below.

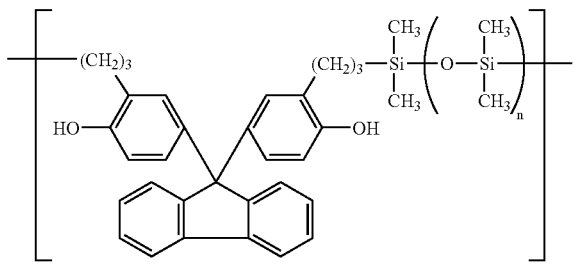

Note that n is 1.

Synthesis Example 2

Aside from using 20.1 g of 4,4'-(9H-fluoren-9-ylidene)bis[(2-propenyl)phenol] and 37.3 g of dihydromethylpolysiloxane having the following formula:

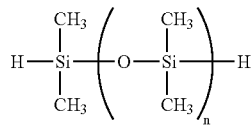

wherein n is 10, 54 g of a liquid product was obtained as in Synthesis Example 1. On similar GPC analysis, the product had a weight average molecular weight of 39,000 as determined on a basis of polystyrene standards.

Similar structural analyses indicated that the product was an organosiloxane polymer having the same recurring units as in Synthesis Example 1 except for n=10.

Synthesis Example 3

Aside from using 3.1 g of 4,4'-(9H-fluoren-9-ylidene)bis[(2-propenyl)phenol] and 54.2 g of dihydromethylpolysiloxane having the following formula:

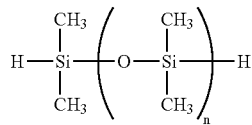

wherein n is 100, 54 g of a liquid product was obtained as in Synthesis Example 1. On similar GPC analysis, the product had a weight average molecular weight of 252,000 as determined on a basis of polystyrene standards. Similar structural analyses indicated that the product was an organosiloxane polymer having the same recurring units as in Synthesis Example 1 except for n=100.

The fluorene skeleton-bearing, silicone-modified phenolic resins (simply referred to as "fluorene phenolic resin" in Examples), the compounds having at least two epoxy groups in a molecule, and the cure accelerators used in Examples are shown below.

Fluorene Phenolic Resin 1:
  prepared in Synthesis Example 1
  silicone content 23 wt %
  phenolic hydroxyl equivalent 282

Fluorene Phenolic Resin 2:
  prepared in Synthesis Example 2
  silicone content 65 wt %
  phenolic hydroxyl equivalent 615

Fluorene Phenolic Resin 3:
  prepared in Synthesis Example 3
  silicone content 95 wt %
  phenolic hydroxyl equivalent 3945

Epoxy Compound A:
  bisphenol A epoxy resin
  epoxy equivalent 185

Epoxy Compound B:
  bisphenol F epoxy resin
  epoxy equivalent 175

Epoxy Compound C:
  o-cresol novolac epoxy resin
  epoxy equivalent 200

Epoxy Compound D:
  ester type alicyclic epoxy resin
  epoxy equivalent 135

Epoxy Compound E:
  hexahydrophthalic acid diglycidyl ester
  epoxy equivalent 175

Epoxy Compound F:
  triglycidyl p-aminophenol
  epoxy equivalent 104

Epoxy Compound G:
  triglycidyl isocyanurate
  epoxy equivalent 105

Epoxy Compound H:
  biphenyl skeleton-bearing epoxy resin
  epoxy equivalent 190

Epoxy Compound I:
  triphenolmethane triglycidyl ether
  epoxy equivalent 165

TPP:
  triphenylphosphine

DBU:
  1,7-diazabicyclo(5,4,0)undecene-7

2E4MZ:
  2-ethyl-4-methylimidazole

Examples 1–13 and Comparative Examples 1–3

Epoxy resin compositions of Examples 1–13 and Comparative Examples 1–3 were prepared by compounding suitable components according to the formulation shown in Tables 1 and 2. The physical properties of these compositions were measured by the tests described below, with the results also shown in Tables 1 and 2.

Preparation of Test Specimens

For each composition, a sheet of predetermined thickness was formed using a sheet-forming machine and cured in an oven at 100° C. for one hour and then at 150° C. for 4 hours.

Measurement of Physical Properties

Tg and Young's Modulus:

Each composition was worked into a sheet of 0.5 mm thick and cut into a test strip of 20 mm long by 5 mm wide. Using a solid viscoelasticity meter (Vibron), Young's modulus was measured while heating the strip at a rate of 5° C./min over a temperature range from –100° C. to 200° C. The peak temperature of tan δ during the measurement is a glass transition temperature (Tg).

Coefficient of Linear Expansion:

Using the same test strip as above and a thermo-mechanical analyzer (TMA), a coefficient of linear expansion was measured while heating the strip at a rate of 5° C./min over a temperature range from –100° C. to 200° C.

Tensile Strength and Elongation:

Using the same test strip as above and a universal mechanical property tester or autograph, a tensile test was carried out at room temperature and a pulling speed of 5 mm/min. The amount of deformation that the strip undergoes until breakage is an elongation.

Volume Resistivity:

Each composition was worked into a sheet of 1 mm thick, which was measured for volume resistivity at room temperature and 150° C. according to the test method of JIS K6249.

Dielectric Constant, Dielectric Dissipation Factor and Breakdown Voltage:

Using the same test strip as used in the volume resistivity measurement, dielectric constant, dielectric dissipation factor and breakdown voltage were measured at room temperature according to the test method of JIS K6249.

Water Absorption:

Each composition was worked into a sheet of 3 mm thick and punched into a disk having a diameter of 50 mm. The disk specimen was subjected to a pressure cooker test (PCT) at 121° C., 2 atm. and 100% RH for 72 hours, after which a weight change was determined. A percent water absorption was calculated from the weight change.

TABLE 1

| Ingredients (pbw) | Example | | | | | | | |
|---|---|---|---|---|---|---|---|---|
| | 1 | 2 | 3 | 4 | 5 | 6 | 7 | 8 |
| Fluorene phenolic resin 1 | 60 | | | | | | | |
| Fluorene phenolic resin 2 | | 77 | | 77 | 77 | 78 | 75 | 82 |
| Fluorene phenolic resin 3 | | | 96 | | | | | |
| Epoxy compound A | 40 | 23 | 4 | 23 | 23 | | | |
| Epoxy compound B | | | | | | 22 | | |
| Epoxy compound C | | | | | | | 25 | |
| Epoxy compound D | | | | | | | | 18 |
| Epoxy compound E | | | | | | | | |
| Epoxy compound F | | | | | | | | |
| Epoxy compound G | | | | | | | | |
| Epoxy compound H | | | | | | | | |
| Epoxy compound I | | | | | | | | |
| TPP | | | | 2 | | | | |
| DBU | 2 | 2 | 2 | | | 2 | 2 | 2 |
| 2E4MZ | | | | | 2 | | | |
| Test results | | | | | | | | |
| Tg (° C.) | –5 | –37 | –70 | –40 | –28 | –32 | 17 | –40 |
| Coefficient of linear expansion α1 (ppm) | 75 | 83 | 120 | 80 | 72 | 78 | 70 | 68 |
| Coefficient of linear expansion α2 (ppm) | 200 | 230 | 260 | 230 | 230 | 250 | 210 | 200 |
| Young's modulus @ –50° C. (MPa) | 300 | 150 | 90 | 160 | 170 | 150 | 2060 | 160 |
| Young's modulus @ 25° C. (MPa) | 100 | 70 | 30 | 80 | 90 | 80 | 950 | 60 |
| Young's modulus @ 150° C. (MPa) | 20 | 8 | 4 | 9 | 10 | 8 | 77 | 3 |
| Tensile strength (MPa) | 10 | 8 | 8 | 10 | 9 | 9 | 15 | 7 |
| Elongation (%) | 25 | 35 | 50 | 30 | 33 | 34 | 5 | 41 |
| Volume resistivity @ 25° C. (TΩ-m) | 200 | 190 | 170 | 200 | 200 | 200 | 230 | 190 |
| Volume resistivity @ 150° C. (GΩ-m) | 80 | 70 | 60 | 70 | 70 | 80 | 100 | 80 |
| Dielectric constant | 2.5 | 2.5 | 2.5 | 2.2 | 2.1 | 2.3 | 2.2 | 2.4 |
| Dielectric dissipation factor | 0.008 | 0.008 | 0.007 | 0.009 | 0.008 | 0.007 | 0.008 | 0.007 |
| Breakdown voltage (V/μm) | 240 | 250 | 260 | 250 | 260 | 280 | 270 | 270 |
| Water absorption (%) | 1.5 | 1.7 | 1.8 | 1.5 | 1.6 | 1.8 | 1.5 | 2.0 |

TABLE 2

| Ingredients (pbw) | Example 9 | Example 10 | Example 11 | Example 12 | Example 13 | Comparative Example 1 | Comparative Example 2 | Comparative Example 3 |
|---|---|---|---|---|---|---|---|---|
| Fluorene phenolic resin 1 | | | | | | | | |
| Fluorene phenolic resin 2 | 78 | 86 | 85 | 76 | 79 | | | |
| Fluorene phenolic resin 3 | | | | | | | | |
| Methyltetrahydrophthalic anhydride | | | | | | 100 | 100 | |
| Novolak phenolic resin | | | | | | | | 100 |
| Epoxy compound A | | | | | | 111 | | |
| Epoxy compound B | | | | | | | 105 | |
| Epoxy compound C | | | | | | | | 182 |
| Epoxy compound D | | | | | | | | |
| Epoxy compound E | 22 | | | | | | | |
| Epoxy compound F | | 14 | | | | | | |
| Epoxy compound G | | | 15 | | | | | |
| Epoxy compound H | | | | 24 | | | | |
| Epoxy compound I | | | | | 21 | | | |
| TPP | | | | | | | | |
| DBU | 2 | 1 | 2 | 2 | 2 | 3 | 3 | 3 |
| 2E4MZ | | | | | | | | |
| Test results | | | | | | | | |
| Tg (° C.) | −45 | −36 | 34 | −47 | 25 | 125 | 120 | 155 |
| Coefficient of linear expansion α1 (ppm) | 73 | 74 | 70 | 74 | 74 | 62 | 63 | 60 |
| Coefficient of linear expansion α2 (ppm) | 220 | 220 | 210 | 220 | 220 | 270 | 260 | 240 |
| Young's modulus @ −50° C. (MPa) | 140 | 150 | 4650 | 140 | 3100 | 4800 | 4000 | 5500 |
| Young's modulus @ 25° C. (MPa) | 70 | 90 | 1860 | 60 | 1200 | 3200 | 2800 | 4100 |
| Young's modulus @ 150° C. (MPa) | 5 | 6 | 450 | 7 | 130 | 80 | 70 | 2400 |
| Tensile strength (MPa) | 11 | 12 | 14 | 11 | 13 | 15 | 20 | 22 |
| Elongation (%) | 39 | 35 | 2 | 30 | 4 | 0.3 | 0.4 | 0.4 |
| Volume resistivity @ 25° C. (TΩ-m) | 200 | 190 | 180 | 200 | 190 | 100 | 100 | 80 |
| Volume resistivity @ 150° C. (GΩ-m) | 90 | 80 | 90 | 80 | 90 | 50 | 70 | 50 |
| Dielectric constant | 2.3 | 2.2 | 2.1 | 2.4 | 2.2 | 3.4 | 3.5 | 4.1 |
| Dielectric dissipation factor | 0.009 | 0.008 | 0.007 | 0.008 | 0.007 | 0.018 | 0.015 | 0.014 |
| Breakdown voltage (V/μm) | 260 | 260 | 250 | 260 | 240 | 190 | 170 | 150 |
| Water absorption (%) | 2.3 | 2.5 | 2.4 | 1.5 | 1.6 | 2.7 | 3.1 | 2.1 |

In contrast to the prior art epoxy resin compositions of Comparative Examples, the compositions of Examples within the scope of the invention show the behavior that as the content of flexible silicone molecular skeleton increases, the Young's modulus declines significantly and approaches nearly zero at 150° C., and the elongation increases to 50% at maximum. On the other hand, the tensile strength, which is believed to be noticeably reduced by the introduction of silicone, remains substantially the same as before, due to the influence of robust fluorene molecular skeleton. Based on these results, the inventive epoxy resin compositions are expected to find use in an elastomer application, for example, as sheet materials or the like.

With reference to electrical properties, the inventive epoxy resin compositions are low dielectric due to the influence of fluorene molecular skeleton and exhibit electric insulating properties equal to or better than the prior art epoxy resin compositions. The inventive epoxy resin compositions are thus expected to find use as laminate board materials for electronic circuitry.

The inventive epoxy resin compositions have a water absorption equal to or less than the prior art epoxy resin compositions.

It is thus evident that epoxy resin compositions obtained by using a fluorene skeleton-bearing, silicone-modified phenolic resin as a curing agent and compounding it in various epoxy compounds cure into products which have flexibility, toughness, electric insulating properties and low water absorption and are very useful in various commercial applications.

There have been described epoxy resin compositions which cure into elastomeric products having a low elasticity, toughness and low dielectric properties. They are used not only in conventional applications as semiconductor encapsulants, adhesives and paints, but also in the sheet material field where few conventional epoxy resin composition have been used.

Japanese Patent Application No. 2002-235623 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An epoxy resin composition comprising
   (i) compound having at least two epoxy groups in a molecule as a main component,
   (ii) fluorene skeleton-bearing, silicone-modified phenolic resin comprising recurring units of the following general formula (1) and having a weight average molecular weight of 1,000 to 500,000, as a curing agent,

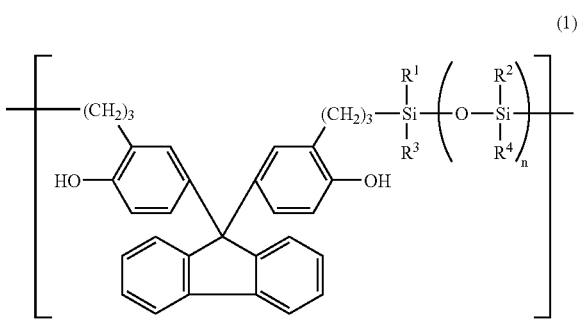

(1)

wherein $R^1$ to $R^4$ are each independently a monovalent hydrocarbon group having 1 to 10 carbon atoms, n representative of the number of repeating units is an integer of 1 to 2,000, and (iii) in addition to (i) and (ii), at least one cure accelerator selected from the group consisting of organophosphorus compounds, amine compounds; and imidazole compounds.

2. The epoxy resin composition of claim 1 wherein components (i) and (ii) are used in such amounts that the ratio of the number of epoxy groups in component (i) to the number of phenolic hydroxyl groups in component (ii) is from 0.1:1 to 10:1.

3. The epoxy resin composition of claim 1 wherein component (iii) is used in an amount of 0.1 to 10% by weight based on the total weight of components (i) and (ii).

4. An epoxy resin composition according to claim 1 in which the epoxy component (i) is one or more compounds selected the group cosisting of from bisphenol A epoxy resins, bisphenol F epoxy resins, phenol novolac epoxy resins, o-cresol novolac type epoxy resins, alicyclic diepoxyacetal, alicyclic diepoxyadipate, alicyclic diepoxycarboxylate, vinylcyclohexene dioxide, phthalic acid diglycidyl ester, tetrahydrophthalic acid diglycidyl ester, hexahydrophthalic acid diglycidyl ester, p-hydroxybenzoic acid diglycidyl ester, norbornane-2,3-dicarboxylic acid diglycidyl ester, 5-norbornene-2,3-dicarboxylic acid diglycidyl ester, hexahydrotrimellitic acid triglycidyl ester, N,N-diglycidylaniline, tetraglycidyl diaminodiphenylmethane, triglycidyl p-aminophenol, triglycidyl m-aminophenol, diglycidyl toluidine, tetraglycidyl m-xylenediamine, tetraglycidyl bisaminomethylcyclohexane, diglycidyl hydantoin, glycidyl glycidoxyalkylhydantoin, triglycidyl isocyanurate, 2,2',4,4'-tetramethylbiphenyl-3,3'-diglycidyl ether, triphenylmethane triglycidyl ether, di(methylphenyl)-t-butylphenyl triglycidyl ether, and phenol naphthalene novolac epoxy resins.

5. An epoxy resin composition according to claim 2 in which said ratio is from 0.5:1 to 2:1.

6. An epoxy resin composition according to claim 1 in which the silicone-modified phenolic resin component (ii) has a weight average molecular weight of from 1,000 to 5,000.

7. An epoxy resin composition according to claim 1 in which, in addition to said silicone-modified phenolic resin curing agent (ii), one or more further curing agents for epoxy resin is included, constituting not more than 50 wt % of total curing agent.

8. An epoxy resin composition according to claim 1 in which the cure accelerator compound (iii) is selected from the group consisting of triphenylphosphine, tributylphosphine, tridecyiphosphine, triphenylphosphine triphenylborane, tetraphenyiphosphonium tetraphenylborate, dimethyltetraphenyl diphosphine, benzyldimethylamine (BDMA), d methylaminomethylphenol (DMP-10), tris(dimethylaminomethyl)phenol (DMP-30), 1,8-diazabicyclo(5,4,0)undecene-7 (DBU), 2-methyl-4-ethylimidazole (2E4MZ), 2-phenylimidazole (2PZ), 2-methylimidazole (2MZ) and 1-benzyl-2-phenylimidazole (1B2PZ).

9. An article comprising an epoxy resin composition according to claim 1 in cured state.

* * * * *